US United States Patent Office 3,552,916
Patented Jan. 5, 1971

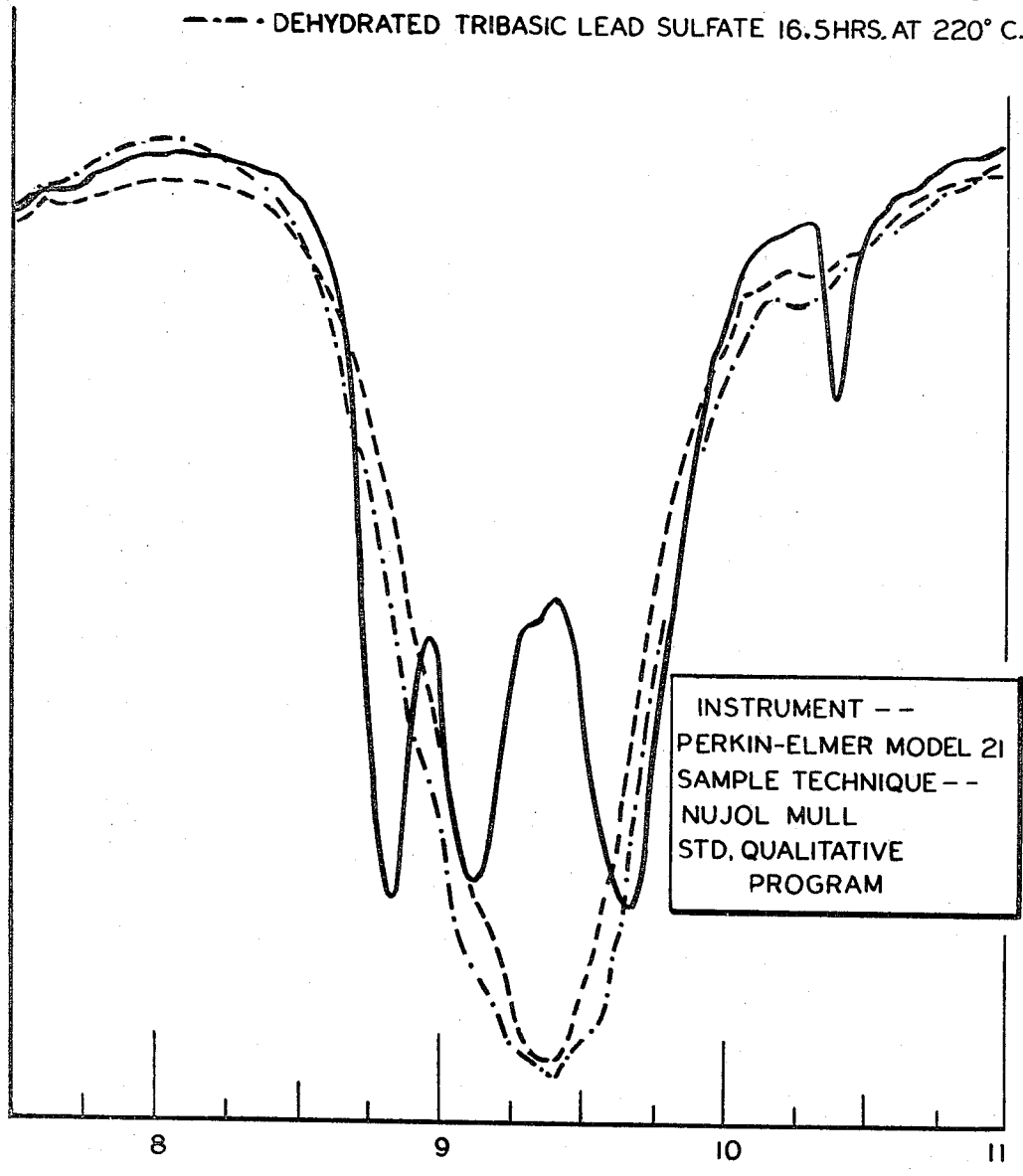

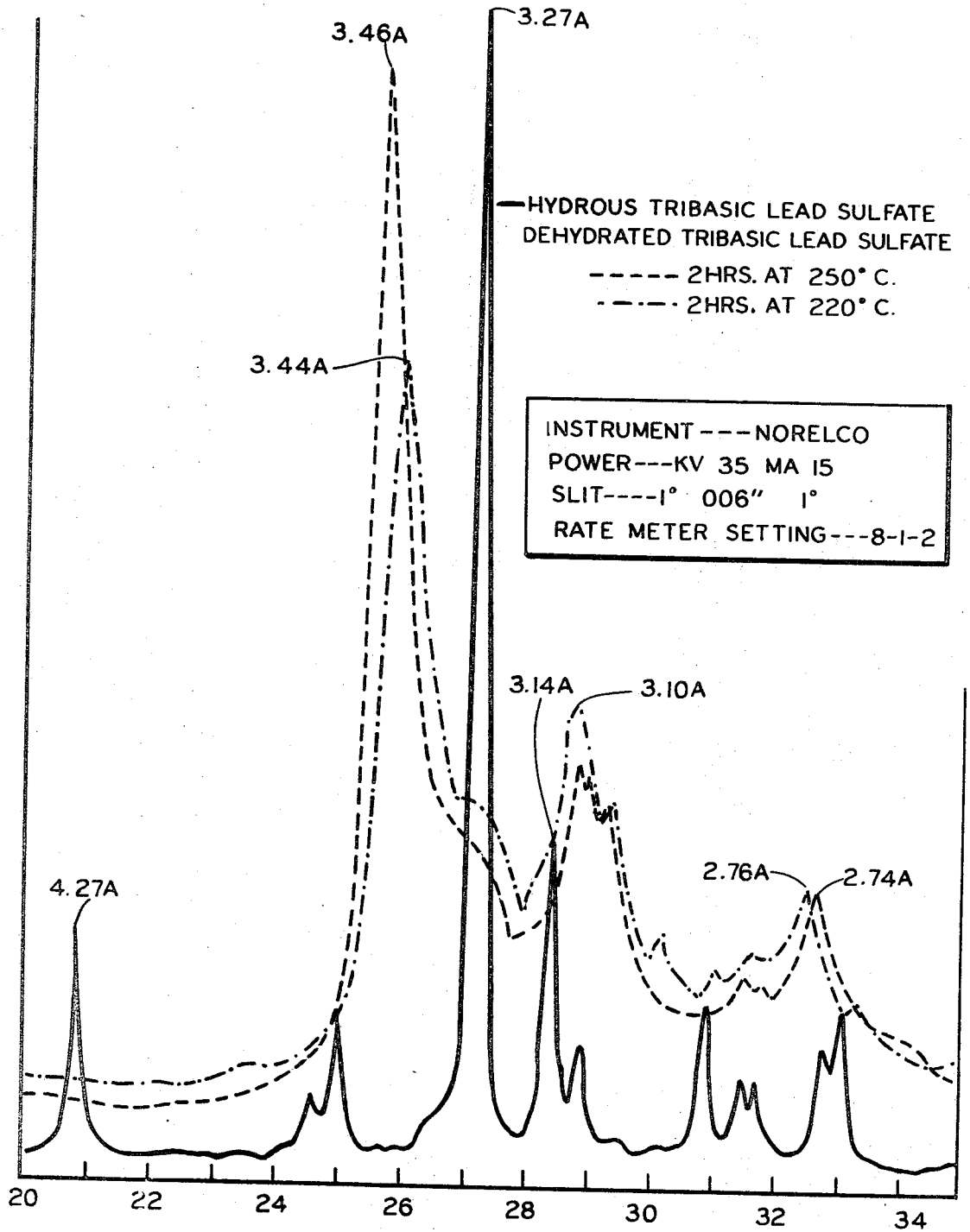

3,552,916
ACICULAR ANHYDROUS TRIBASIC LEAD SULFATE AND ITS METHOD OF PREPARATION
Edward L. White, Freehold, N.J., and Adrian R. Pitrot, Uniondale, N.Y., assignors to National Lead Company, New York, N.Y., a corporation of New Jersey
Filed Nov. 4, 1966, Ser. No. 592,052
Int. Cl. C01g 21/20
U.S. Cl. 23—127          5 Claims

ABSTRACT OF THE DISCLOSURE

Acicular anhydrous tribasic lead sulfate is prepared by heating hydrous tribasic lead sulfate at temperatures between about 180° C. and 400° C.

Figure 1:
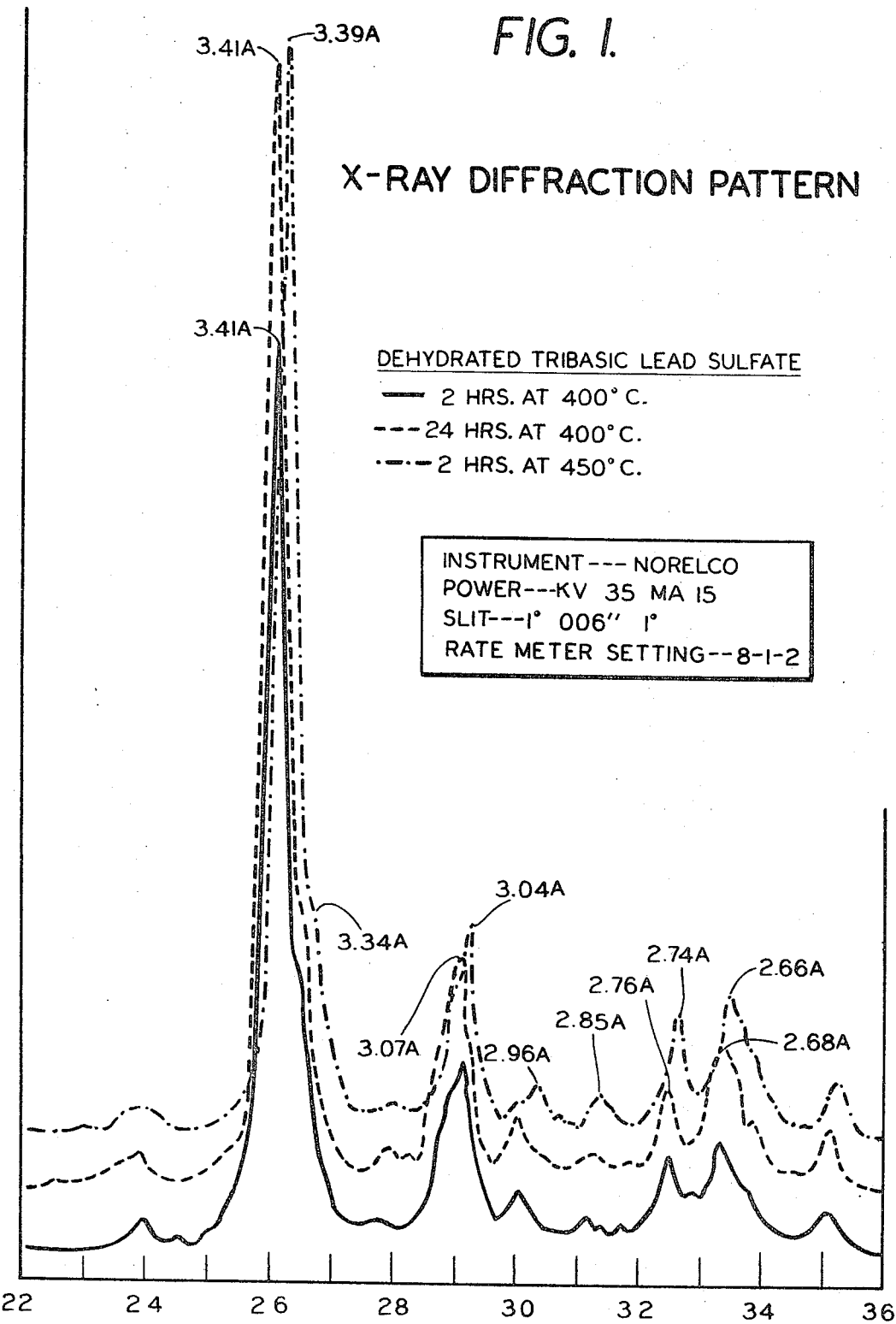

This invention is generally concerned with the preparation and use of novel stabilizers for resins and polymers and novel compositions thereof, and more particularly is concerned with the preparation of dehydrated tribasic lead sulfate, as a new composition of matter and its use in polyvinyl chloride polymer compositions.

It is an object of this invention to prepare stabilized polymer systems which can be processed into finished products at high temperatures.

It is also an object to provide a novel tribasic lead sulfate, especially adapted for use in polymer compositions.

Another object of this invention is the improvement of tribasic lead sulfate as a stabilizer for polyvinyl chloride polymers.

Another object is to prepare novel compositions consisting essentially of dehydrated tribasic lead sulfate having surprising and unexpected properties which differ from those of the hydrated product.

A further object is to prepare novel compositions of heat stabilized polyvinyl chloride resins.

Another object is to provide a tribasic lead sulfate product for use as stabilizer in polyvinyl chloride resins whereby there is no gassing of the composition at molding temperatures.

Other and further objects will become apparent from the detailed description of the invention presented herein below.

There are a number of methods known for manufacture of tribasic lead sulfate. One such method which is used commercially is to prepare a slurry of lead oxide or of finely divided lead or a mixture of both in water containing a small amount of a catalytic agent such as acetic acid. Air may also be introduced to oxidize any metallic lead which may be present. There is then added to the resulting agitated slurry in one or more steps, sulfuric acid. As a result, reaction occurs to produce hydrated tribasic lead sulfate which is then filtered, washed and dried. Excess acid is to be avoided. The product after suitable drying is generally identified as $3PbO \cdot PbSO_4 \cdot H_2O$.

Among other uses for this tribasic lead sulfate, it has been found to be highly effective as a heat stabilizer in polyvinyl chloride resin compositions. It can be used in most applications except those where transparency of the product is an essential feature, since it imparts opacity. It is adapted for use in compositions which comprise principally polymerized vinyl and vinylidene chloride, vinyl chloride-acetate copolymers, as well as other halogenated polymers and elastomers, and also mxtures of these materials. The terms vinyl resin and vinyl chloride resin and compositions are intended to include all such compositions which may or may not include plasticizers added to impart flexibility, fillers, and other additives included for particular purposes. Tribasic lead sulfate is useful as well in non-halogen containing polymers which are compounded with halogen containing additives for the purpose of flame-proofing. Also, it is useful in elastomers such as butadiene-acrylonitrile, butadiene-styrene and acrylonitrile-butadiene-styrene copolymers and other materials such as neoprene and natural rubber, where it is employed as a vulcanization activator.

It was found that serious gassing problems occur when the material which is commonly assigned the formula $3PbO \cdot PbSO_4 \cdot H_2O$ and known commercially as tribasic lead sulfate is added to rigid polyvinyl chloride compounds as stabilizer. The gassing problem has generally been found to occur when using hydrous tribasic lead sulfate in rigid polyvinyl chloride polymers during processing operations at temperatures above about 180° C. In the use of the tribasic lead sulfate the gassing and resultant porosity in the finished products were most serious, rendering this otherwise highly effective stabilizer substantially useless. Comparative tests further indicated that the gassing in the presence of the hydrous tribasic lead sulfate was caused by release of some or all of the chemically bound water at the high processing temperatures of the rigid polyvinyl chloride resin. Volatility tests have confirmed that loss of water on heating the dry powder for instance in the range of 200—220° C. amounts to about 2% weight loss. This amount of water loss corresponds to the loss of approximately one molecule of water. However, it is believed that certain other changes may also take place in the basic lead sulfate at the time during the heating.

It has now been found that in view of the above described structure of hydrous tribasic lead sulfate, it can be treated by a heating process to produce a superior stabilizer for rigid polyvinyl chloride polymers. The process generally includes the step of heating hydrous tribasic lead sulfate at room temperatures between about 180° and up to about 400° C. and preferably between 220° and 300° C. thereby converting the material to a new composition as shown by changes in X-ray diffraction, infra-red absorption, and differential thermal analysis (DTA). The new composition has an acicular crystal habit. It is possible to produce this novel material at temperatures below 180° C. but prolonged heating periods are involved. It is also possible to use lower temperatures if subatmospheric pressures are used.

Physical and chemical changes take place when hydrous tribasic lead sulfate is heated at elevated temperatures. As a convenient method for following the course of these changes which take place during the process, the infra-red curves and X-ray patterns can be followed. Certain, typical peaks in the curves diminish and disappear and new ones appear as the changes proceed. For best results, to avoid gassing and the resulting problems when the novel material is used in polymeric compositions to be processed at temperatures above about 180° C., it is preferred to remove at least 80% of the water present in the hydrous tribasic lead sulfate. When the monohydrate is the starting material for heating, this corresponds to a loss of weight of about 1.46 to 1.82. To follow the dehydration portion of the process, differential thermal analysis is most useful. A strong endotherm characteristic of the hydrous material disappears when the starting material has been essentially dehydrated.

It has been found that heating hydrous tribasic lead sulfate to 180° C. up to 400° C. resulted in a new composition of matter characterized by having the general formula $3PbO \cdot PbSO_4$ and an X-ray diffraction pattern with major or characteristic peaks in the vicinity of 3.45 A., 3.10 A., and 2.75 A. Also the new composition is characterized by having a broad peak at 9.4 microns wave length of infra-red absorption.

In order to prepare the novel dehydrated tribasic lead sulfate it is necessary to heat the material, at temperatures of 180° C. and above, and preferably in a finely divided state to temperatures in the range of 220° C. or above. The length of time required varies somewhat depending on the degree of subdivision of the product, the kind of heating and the kind and amount of water present in the initial mass of material. It is for instance contemplated that a slurry or wet tribasic lead sulfate can be heated and the extraneous water and the chemically bound water removed in one step or a series of continued heating steps. Data has thus shown that the process as developed for producing the dehydrated tribasic lead sulfate including removal of the chemically bound water ordinarily associated therewith is entirely practical and commercial. Wet cake of 50% and more solids can be used. Residual impurities of various kinds including inorganic oxides and salts do not prevent or inhibit the removal of the required amount of water nor do they interfere in any other way with the process. For example, residual lead acetate which sometimes is produced during manufacture of tribasic lead sulfate has no effect on the required removal of the water.

An upper temperature up to 400° C. is critical for the heating temperature. If substantial periods of heating are carried out above this temperature level, then disproportionation of the tribasic lead sulfate into monnobasic lead sulfate and tetrabasic lead sulfate becomes appreciable as shown by X-ray diffraction data in FIG. 1. This is evidenced by the appearance at 450° C. of a shoulder on the curve at 3.34 A. and new peaks at 2.96 A. and at 2.85 A. When disproportionation first starts, a new peak appears at 3.34 A. with supporting peaks at 2.96 A. and 2.85 A., which is characteristic of monobasic lead sulfate. As further breakdown occurs a new peak appears at 3.25 A. with supporting peaks at 3.07 A. and 2.66 A. which is characteristic of tetrabasic lead sulfate. As low as 1% tetrabasic sulfate is detectable by this method; and since the monobasic peak appears before the tetrabasic peak, the limit of detectability of moonbasic lead sulfate is very low also.

No special processing equipment is necessary for carrying out the dehydration. For example, the dehydration can be accomplished by simple heating in an oven or kiln or, if desired, the water can be removed by azeotrope formation, using decalin or some other azeotroping agent of suitable boiling point or range.

Figure 2:
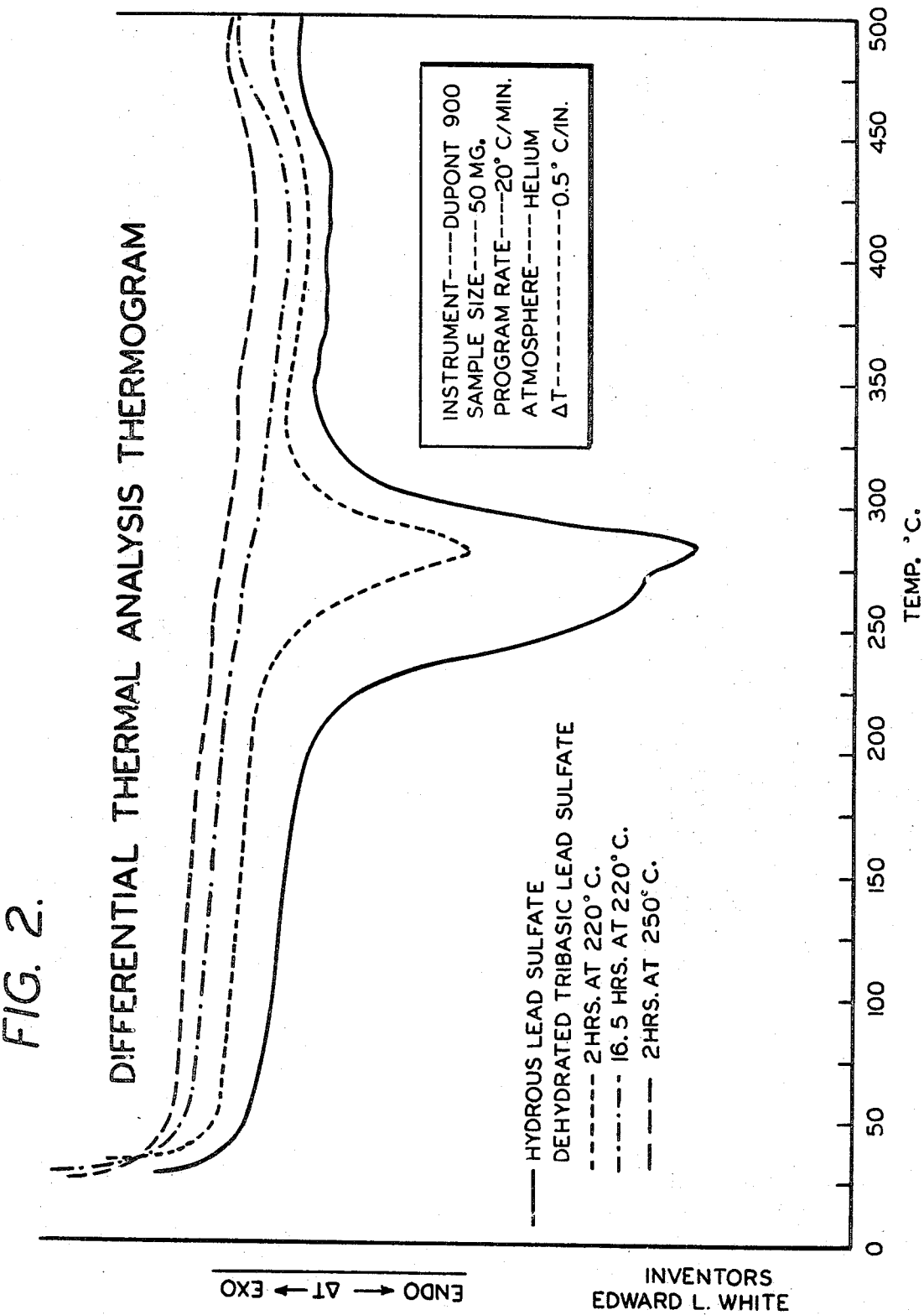

As a further advantage in this novel processing step for manufacture of dehydrated tribasic lead sulfate, it has been demonstrated that there is no loss in heat stability performance in the polyvinyl resins when the dehydrated tribasic lead sulfate is heated for instance for periods of time up to five hours at 220–300° C. Weight loss and DTA data have shown that there is a release of water during the heating of the commercial hydrous tribasic lead sulfate. This is evidenced by the absence of the characteristic endotherm in the dehydrated materials as shown in FIG. 2. Other physical data obtained from the dehydrated tribasic lead sulfate also indicate that substantially all water has been removed.

Series of tests have been carried out using the standard commercial hydrous tribasic lead sulfate and the material after it had been heated in accord with the herein described invention. In order to carry out these tests, the materials were respectively incorporated as stabilizers by the usual compounding methods into commercial polyvinyl chloride compositions. Tests were then carried out on the resulting resin samples in connection with high temperature molding operations.

It was noted that when the plastic compositions are heated in a closed mold, under pressure, at a temperature of 233° to 245° C., and the molded article removed from the mold while hot, there is evidence of gassing when the standard hydrous tribasic lead sulfate is used, in that the molded products show porosity. On the other hand, when the product of this invention is employed under similar conditions, no gassing is evident. It was also found that very little gassing occurs with any of the compositions when the temperature during molding operations does not exceed about 200° C.

It is to be understood that the dehydrated tribasic lead sulfate corresponding to the general formula $$3PbO \cdot PbSO_4$$

as described herein is believed to be a new heretofore unknown composition of matter, as shown by its X-ray diffraction patterns, infra-red and other physical and chemical data. The process for making the dehydrated product is also considered to be novel. Also considered a part of this invention are the resins, rubbers, polymers, and various elastomeric materials containing the dehydrated tribasic lead sulfate, the compositions thereof being regarded as novel products.

The dehydrated tribasic lead sulfate is effective as a stabilizer when used in proportions of from 0.5% to 25% of the weight of the vinyl resin portion of the composition. High amounts are required where the compositions are to be subjected to excessive processing temperatures. The compositions produced containing the dehydrated tribasic lead sulfate have excellent resistance to the aging effect of heat and moisture, and also have good color, electrical, and other physical properties. They withstand the high temperatures commonly used for extruding, molding and calendering vinyl plastic compositions.

The novel dehydrated product may be readily incorporated into the compositions in the usual manner as is known to those skilled in the art. No special methods of incorporation are required. The product may be used for instance in polymers such as halogenated organic resins and in polymers modified with halogenated organic materials as well as in elastomeric compositions, and also as pigments and/or fillers in film-forming compositions such as paints.

The invention will be described in more detail in the examples presented herein below. It is not, however, intended to limit the invention in any way to the specific embodiments presented herein. All parts and percentages are by weight unless otherwise specified.

EXAMPLE 1

The preparation of dehydrated tribasic lead sulfate was carried out by incorporating 227 grams of litharge (100 mesh) into 650 cc. water. The container was placed on a hot plate and the mixture treated with 4.8 cc. of 10% acetic acid and subjected to agitation. 25.98 g. (95.56%) sulfuric acid were then added over a period of about 10 minutes. The temperature was about 40° C. After a total of about 40 minutes, the product was an easily stirred white slurry. After about one hour total time, the pH of the mixture was 7.7. The solid product was filtered off and dried at 95° C. giving a yield of 250.7 grams. The dried product was then heated at about 200° C. in an electric muffle furnace, whereby a loss of 4.55 g. or 1.81% occurred. The heated product was cooled and hammer milled (0.020 inch screen).

EXAMPLE 2

Hydrated (hydrous) tribasic lead sulfate was prepared substantially as described above except the following charge was used:

62.35 g. (95.56%) sulfuric acid
546.79 g. litharge in 1560 cc. $H_2O$ containing 11.52 cc. of 10% acetic acid
Final pH 7.7

About 100 grams of the product were milled (0.020 inch screen) and this same was kept as a control. The remainder was divided into equal (100 g.) portions and heated in air in an electric muffle furnace for five hours at varying temperatures and then were ground in a hammer mill. The results are tabulated below.

TABLE I

| | Experiment No. | | | |
|---|---|---|---|---|
| | 1 | 2 | 3 | 4 |
| Heating temp., °C | 200 | 220 | 240 | 260 |
| Weight heated, g | 100.25 | 100.0 | 100.65 | 100.0 |
| Weight loss, percent | 1.69 | 1.90 | 1.90 | 1.95 |
| Product color | (1) | (1) | (1) | (2) |

[1] White.
[2] Cream.

Hydrous tribasic lead sulfate was heated for the indicated number of hours at a series of temperatures as shown in Table II below. X-ray diffraction data of these products in comparison to the previous known lead sulfate products are given in the table.

TABLE II

| Material | T. °C. | X-ray diffraction (2θ) | | |
|---|---|---|---|---|
| | | d* | d* | d* |
| Hydrous tribasic lead sulfate | | 3.27 | 3.14 | 9.82 |
| Dehydrated tribasic lead sulfate [1] | 180 | 3.41 | 3.12 | 2.74 |
| Do | 200 | 3.45 | 3.10 | 2.75 |
| Do | 220 | 3.48 | 3.12 | 2.74 |
| Do | 240 | 3.48 | 3.12 | 2.76 |
| Do | 260 | 3.42 | 3.09 | 2.76 |
| Dehydrated tribasic lead sulfate [2] | 300 | 3.46 | 3.08 | 2.75 |
| Do | 360 | 3.40 | 3.04 | 2.73 |
| Do | 400 | 3.41 | 3.09 | 2.74 |
| Do | 440 | 3.38 | 3.05 | [3] 2.74 |
| Do | 480 | 3.37 | 3.04 | [4] 2.73 |
| Do | 500 | 3.39 | 3.05 | [4] 2.74 |
| Do | 550 | 3.22 | 2.66 | 3.07 |
| Do | 600 | 3.22 | 2.66 | 3.07 |
| Tetrabasic lead sulfate | | 3.25 | 2.66 | 3.07 |
| Monobasic lead sulfate | | 3.33 | 2.95 | 2.86 |

[1] The samples heated from 180° to 300° were heated for 5 hours each.
[2] The samples heated from 300° to 600° were heated for 2 hours each.
[3] Small peaks of monobasic lead sulfate are present.
[4] Small peaks of monobasic and tetrabasic lead sulfate are presented.
*d is interplanar spacings expressed in angstrom units.

EXAMPLE 3

The many differences between the hydrous and dehydrated tribasic lead sulfate are summarized in Table III and demonstrated in FIGS. 2, 3 and 4.

TABLE III

| | Hydrous tribasic lead sulfate | Dehydrated tribasic lead sulfate |
|---|---|---|
| Chemical formula | $3PbO \cdot PbSO_4 \cdot H_2O$ | Approximate formula $3PbO \cdot PbSO_4$. |
| Theoretical H₂O content | 1.82% | Nil. |
| Weight loss at 220° C. 16 hrs | 1.80–1.90% | Zero to 0.06%. |
| D.T.A. | Strong endotherm starting at 220° C. peaking at 280° C. with a change in slope at 270°–280° C. | No endotherm in this region. |
| Infra-red absorption | 3 sharp peaks of equal intensity at 8.8, 9.1 and 9.7 microns. | Disappearance of 3 characteristic peaks. New broad peak at 9.4 microns. |
| X-ray diffraction patter | Main peak at about 3.27 A | Disappearance of monohydrate peaks new Main peak at about 3.45 A. |

Thermal spectrometry or differential thermal analysis (DTA) as it is better known, measures the heat energy change occurring in a substance as a function of temperature. The DTA instrument directly measures the heat energy changes occurring in a substance. This allows measurement of any physical transition or chemical reaction that is accompanied by a heat energy change. The fact that most changes of state and chemical reactions are accompanied by heat energy changes attests to the usefulness of the technique. The thermal characteristics of many products are their most important property.

Experimentally, the sample is heated side by side with an inert reference material at a uniform rate, and the temperature difference between them is measured as a function of the temperature.

The temperature selected for the conversion of hydrous tribasic lead sulfate to the dehydrated tribasic lead sulfate form must be high enough to remove chemically bound water from the starting material. At the same time it must be below the point at which tribasic lead sulfate begins to disproportionate into monobasic and tetrabasic lead sulfates. When hydrous tribasic lead is heated at 180° C. for 66 hours, a weight loss of 1.81% was found, which corresponds to loss of the theoretical amount of chemically bound water. At a temperature of 220° C. and a heating time of 16½ hours, D.T.A. shows no endotherm in the region of 200° C. to 280° C., infra-red shows a strong peak at 9.4 microns and no peaks at 8.8, 9.1, or 9.7 microns and X-ray shows the sample to be essentially dehydrated tribasic lead sulfate with peaks at 3.45 A., 3.10 A., and 2.75 A. There is also a small peak at 3.27 A. which is indicative of residual hydrous tribasic lead sulfate.

At a temperature of 400° whether the material has been heated for 2, 5, or 24 hours, D.T.A. shows no endotherm in the region of 200–280° C., infra-red shows a broad peak at 9.4 micron and X-ray shows a main peak at 3.41 A., and supporting peaks at 3.04 A. and 2.74 A.

A temperature of 440° C. for 2 hours gives material showing very small peaks at 3.34 A., 2.96 A. and 2.85 A. which is the first evidence of disproportion (monobasic lead sulfate).

A heating temperature of 450° C. for 2 hours, gives an X-ray pattern which shows slightly larger peaks at these d spacings, as shown in FIG. 1.

At a temperature of 480° C. for 2 hours there are shown small peaks at 3.34 A., 2.95 A. and 2.86 A. which indicate the presence of monobasic lead sulfate and new small peaks at 3.23 A., 3.07 A. and 2.88 A. which indicates the presence of tetrabasic lead sulfate.

As the temperature is increased the monobasic and tetrabasic lead sulfate peaks increase in intensity and the dehydrated tribasic lead sulfate peaks diminish until at 550° C. the dehydrated tribasic lead sulfate peaks have disappeared entirely. These major shifts are in contrast to the very slight shift observed in the 2.10 A. peak of dehydrated tribasic lead sulfate which is noted at temperatures of heating about 330° C. At 550° C. the X-ray study shows strong tetrabasic lead sulfate peaks at 3.25 A., 2.66 A. and 3.07 A., indicating complete disproportionation.

EXAMPLE 4

Approximately 25 grams of hydrous tribasic lead sulfate were placed in a #3 Coors porcelain crucible. The crucible was then put into a Hoskins electric furnace adjusted to 220° C. The sample was held in the furnace for 16½ hours, cooled in a desiccator, and transferred to a sample bottle. The dehydrated material showed no D.T.A. endotherm and gave a characteristic infra-red curve for dehydrated tribasic lead sulfate. X-ray showed the material to be essentially the dehydrated form with peaks at 3.46 A., 3.10 A., 2.74 A., and 1.84 A.

EXAMPLE 5

Approximately 30 grams of hydrous tribasic lead sulfate were placed in a #3 Coors porcelain crucible. The crucible was then placed in a mechanical convection oven adjusted to 220° C. The sample was left in the oven for two hours, cooled in a desiccator, and transferred to a sample bottle. Infra-red shows a typical dehydrated patern with an indication of residual water of hydration. X-ray shows the material to be essentially the dehydrated form with peaks at 3.44 A., 3.10 A., 304 A., 2.76 A., and 1.84 A.

EXAMPLE 6

31 grams of hydrous tribasic lead sulfate were mixed with 400 ml. anhydrous decalin at 100° C. in a nitrogen-blanketed flask. The mixture was refluxed 1 hour at 193° C. and the dehydrated product was recovered by filtration, washing with anhydrous heptane, and drying to constant weight at 25" Hg/60° C. In a similar manner samples were dehydrated for 2, 4, 7½ and 16 hours. Percent loss on ignition at 500° C. was 1.96 for the starting material, 1.159 after 1 hour, decreasing to 0.305 after 16 hours. The 7½ hour sample with a loss on ignition at 500° C. of 0.47% shows no water endotherm by differential thermal analysis, the characteristic dehydrated tribasic lead sulfate peak at 9.38 microns by infra-red, and peaks at 3.48 A. and 2.75 A. by X-ray which are characteristic of dehydrated tribasic lead sulfate.

EXAMPLE 7

1500 grams of hydrous tribasic lead sulfate were placed in a rotary kiln adjusted to 215–200° C. Samples were taken after 1 hour, 2 hours, and 2 hours and 35 minutes. Determinations of percent loss on ignition at 500° C. showed that no further measurable dehydration occurred after 2 hours. The loss on ignition at 500° C. was 2.01% for the hydrous material, 0.22% after 2 hours, and 0.21% after two hours and 35 minutes. Substantially the same results as those obtained above were noted.

EXAMPLE 8

A 58 mm. porcelain crucible was filled by packing with hydrous tribasic lead sulfate to within ¼ inch of the top of the crucible. The crucible was placed in a preheated gravity convection oven and a thermocouple, connected to a sensitive galvanometer, was inserted into the packed sample within ⅛" of the bottom of the crucible. A thermometer was placed in the oven in the vicinity of the crucible to measure oven temperature. The thermocouple was used to measure the sample temperature. The material reached 211° C. in 15 minutes and was held at 211–277° C. for 2 hours. Percent loss on ignition at 500° C. was 2.20 for the starting material and 0.27% for the dehydrated sample.

EXAMPLE 9

To study the effect of high temperature heating upon heat stabilizing properties, the heated samples described in Example 2 were incorporated into two rigid polyvinyl chloride plastic compositions.

In the first series of tests the base formulation consisted of 97 parts of Geon 103 EP polyvinyl resin, 3 parts of Acryloid K–120N acrylic processing aid, 1 part lead caprylate and 10 parts of Titanox RA–40 titanium dioxide. These components were thoroughly blended in a Henschel high speed blender. Three parts of the various tribasic lead sulfates were added to aliquot portions of the Henschel dry blend. The resulting compounds were fluxed and mixed on a two roll plastic mill heated to 196° C. and processed into 0.050" sheets in a 4 minute cycle. Portions of the mill processed stocks were molded into smooth sheets in a 10 minute cycle at 177° C. To compare color stabilities, reflectance values were obtained with a Hunter multi-purpose reflectometer using the green and blue filters.

To further compare heat stabilizing properties, portions of the milled stock were subjected to a temperature of 204° C. in a forced draft oven. Samples were withdrawn after 5, 15, and 30 minutes exposure and examined for extent of discoloration.

For still more exhaustive testing, 3 parts of the heated tribasic lead sulfates were incorporated into plastic formulation consisting of 97 parts polyvinyl chloride resin, 3 parts acrylic processing aid, 1.5 parts lead caprylate and 1 part calcium stearate. These compounds were subjected to high shear and temperature, as would be experienced in extrusion or injection molding, using a C. W. Brabender Instruments torque rheometer equipped with a No. 5 roller mixing head. A shear rate of 50 r.p.m. was applied at a test temperature of 197° C. until a rapid increase in mixing torque occurred, indicating massive cross-linking and degradation of the PVC resin. Results of the two series of tests are shown below in Table IV.

TABLE IV

| Heating conditions | Molding 177° C., percent reflectance | | Oven heat 204° C.,* minutes | | | Brabender, failure at 197° C. |
|---|---|---|---|---|---|---|
| | Green | Blue | 5 | 15 | 30 | |
| Dried at 100° C. (Control) | 86.5 | 78.8 | 3 | 4 | 6 | 29.0 |
| 5 hrs. 200° C. | 86.1 | 78.9 | 3 | 4 | 6 | 29.5 |
| 5 hrs. 220° C. | 86.5 | 79.0 | 3 | 4 | 6 | 29.0 |
| 5 hrs. 240° C. | 86.4 | 78.6 | 3 | 4 | 6+ | 31.5 |
| 5 hrs. 260° C. | 86.5 | 79.0 | 3 | 4 | 6+ | 28.5 |

*Color ratings for oven heat stability tests:
1–4=White to off-white.
5–8=Slight to moderate yellow.

The above laboratory test data show that the heat treatment at elevated temperatures of the present invention does not have an adverse effect upon the performance. The dehydrated tribasic lead sulfates and the original hydrous tribasic lead sulfate control impart essentially identical heat stability.

EXAMPLE 10

To demonstrate further the merits of the new tribasic lead sulfate with reference to its utility in providing non-porous vinyl plastic compositions, it was compared to the standard commercial hydrous tribasic lead sulfate in representative rigid (unplasticized) and flexible (plasticized) vinyl plastic compounds.

The vinyl resin and the other components of the plastic (stabilizers, lubricant and plasticizers if present), were blended together in a 1 liter beaker. The dry blends were then fluxed and mixed by processing on a heated two roll plastics mill. After 4 minutes of mill processing, the compound was removed from the mill as an 0.050 inch thick sheet for subsequent molding studies. The mill processing temperature was varied according to the requirement of the plastic compositions, using a temperature of 195° C. for the compounds containing the homopolymer polyvinyl chloride resin (Geon 103 EP) and 163° F. with the polyvinyl chloride-acetate copolymer resin (Vinylite VYNW–5). Both temperatures are below the range in which there is a rapid release of the chemically bound water from hydrous tribasic lead sulfate, accordingly, no gasing was observed during the mill processing.

The mill processed sheets were cut into 3" x 6" test specimens and comparative compression moldings made using the electrically heated platens of a plastic molding press. Two 3" x 6" plastic test specimens, one containing hydrous tribasic lead sulfate and the other the new tribasic lead sulfate in the corresponding formulation, were placed side by side in the heated 6" x 6" x 0.040" mold cavity and molded using a 3 minute cycle. The cycle consisted of preheating the specimens in the mold for 1 minute, application of 20 tons ram pressure over a 1 minute period and maintaining the pressure for 1 minute. A molding temperature of 233° F. was used for the unplasticized compounds and 245° C. for the plasticized compositions. The test specimens were removed from the mold after the 3 minute cycle, allowed to cool, and then examined for gassing or porosity developed in the molding. A summary of the test formulations, test conditions, and gassing observed in the molded sheets is given below.

TABLE V

| Plastic component: | Weight in grams | | | | | |
|---|---|---|---|---|---|---|
| Polyvinyl chloride resin | 100 | 100 | 100 | 100 | | |
| Polyvinyl chloride-acetate resin | | | | | 100 | 100 |
| Ditridecyl phthalate | | | 25 | 25 | | |
| Calcium stearate | 1 | 1 | 1 | 1 | 1 | 1 |
| Hydrous tribasic lead sulfate | 10 | | 10 | | 10 | |
| Dehydrated tribasic lead sulfate | | 10 | | 10 | | 10 |
| Processing conditions: | Temperatures, °C. | | | | | |
| Milling | 195 | 195 | 195 | 195 | 163 | 163 |
| Molding | 233 | 233 | 245 | 245 | 233 | 233 |
| | Degree of gassing | | | | | |
| Appearance of molded sheet, gassing | * | Nil | * | Nil | * | Nil |

*Massive.

The above laboratory test data demonstrate the gassing and porosity reported with commercial vinyl compounds containing commercial hydrous tribasic lead sulfate stabilizer when extruding pipe or profiles at elevated temperatures at which there is a rapid release of the chemically bound water, and show how the novel tribasic lead sulfate of the present invention eliminates this problem.

What is claimed is:

1. As a new compound, acicular anhydrous tribasic lead sulfate, with an X-ray diffraction pattern having characterizing $d$ spacings in the vicinity of 3.45, 3.10 and 2.75 A., and having an infra-red absorption peak at 9.4 microns wave lengths.

2. Acicular, anhydrous tribasic lead sulfate.

3. The process for producing anhydrous tribasic lead sulfate which comprises heating hydrous tribasic lead sulfate at temperatures between about 180 up to about 400° C.

4. The process of claim 3 in which heating is continued until at least 80% of the chemically bound water is removed.

5. The process of claim 3 in which the tribasic lead sulfate is wet cake containing at least 50% solids.

References Cited

UNITED STATES PATENTS

| 2,872,333 | 2/1959 | Adams | 23—127X |
| 3,194,685 | 7/1965 | Malloy | 23—127X |

EARL C. THOMAS, Primary Examiner

U.S. Cl. X.R.

260—45.75